Dec. 27, 1932.    A. S. PRAGERSTORFER    1,892,470
BAND SAW BLADE GUIDE
Filed Feb. 26, 1931    2 Sheets-Sheet 1
Fig.:1
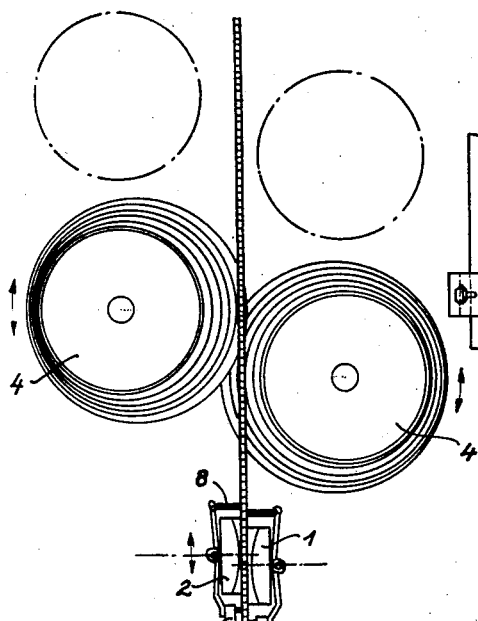
Fig.:3
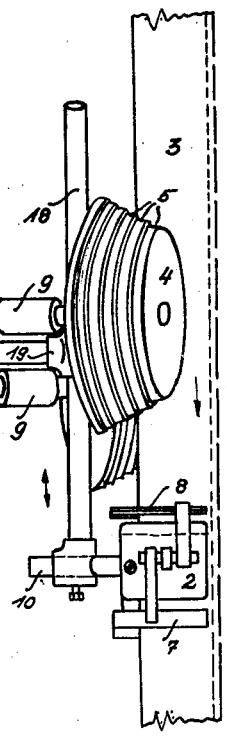
Fig.:2
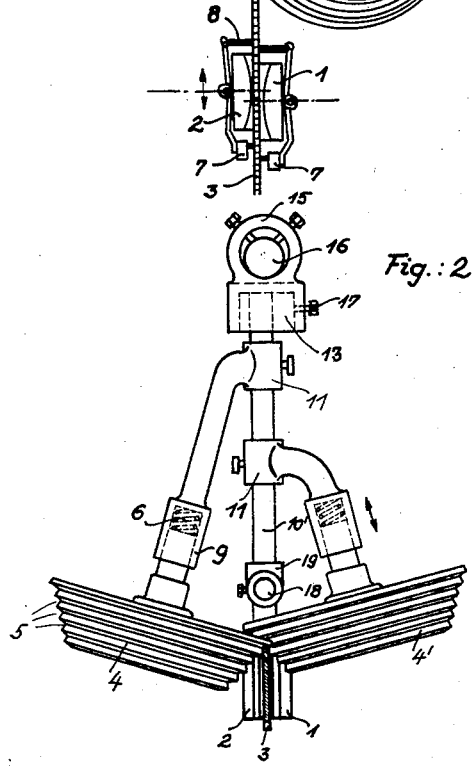
Inventor
A. S. Pragerstorfer Dec. 27, 1932.  A. S. PRAGERSTORFER  1,892,470
BAND SAW BLADE GUIDE
Filed Feb. 26, 1931  2 Sheets-Sheet 2
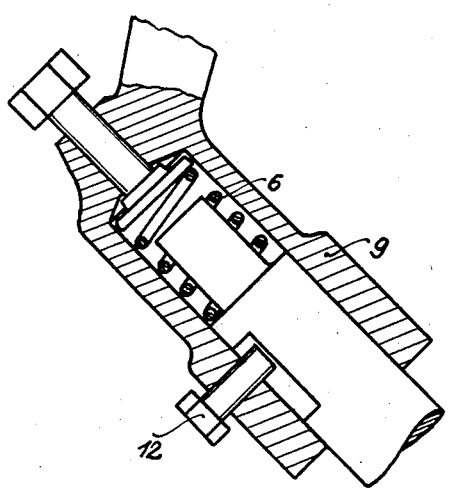
Fig.: 4
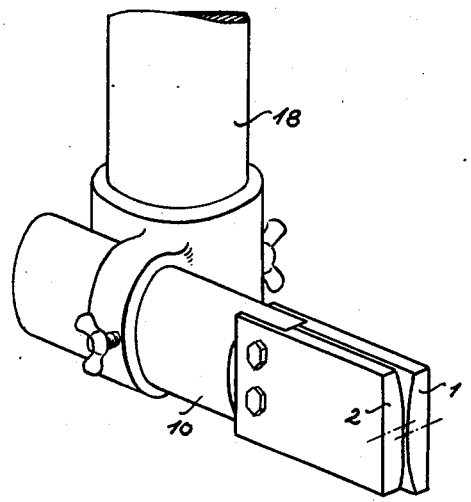
Fig.: 6
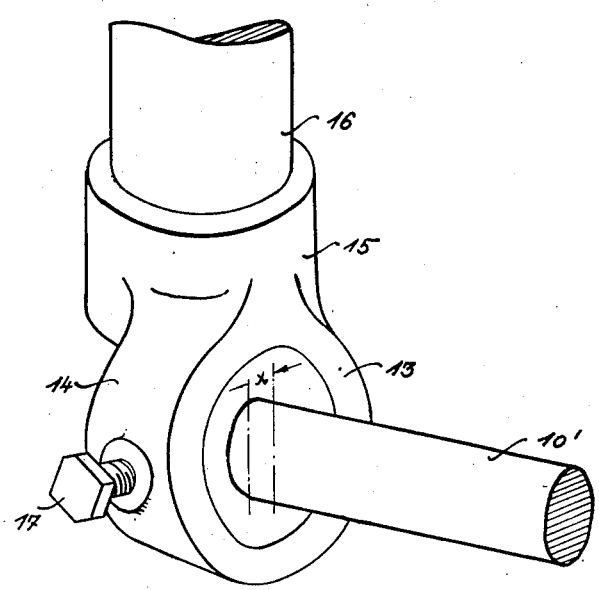
Fig.: 5

Patented Dec. 27, 1932

1,892,470

UNITED STATES PATENT OFFICE

ANTON STEFAN PRAGERSTORFER, OF VIENNA, AUSTRIA

BAND SAW BLADE GUIDE

Application filed February 26, 1931, Serial No. 518,515, and in Austria February 26, 1930.

This invention provides a band saw blade guide having the advantage that the running blade is supported at back and sides with the least possible friction.

One object of the invention is the arrangement of rigid and non-rotatable side guide cheeks with curved guide surfaces. When smooth back guide rollers are used, the saw blade is brought out of its path, pressed on the side cheeks, and worn away thereon. In meeting resistance in the work to be cut, the blade is also brought out of its path, bears on the lower edges of the side cheeks which are nearest the work and wears these away rapidly at that point. By provision of curved guide surfaces, the band in any position bears tangentially on the cheeks and wearing away is prevented.

A further object of the invention is the use of stepped conical back guide rollers, by means of which a point contact between the back guide and the blade and also a lateral support preventing the back from being displaced on the roller is obtained. The hitherto used flat back guides and cylindrical rollers have great disadvantages. The flat guides exert a braking effect on the saw blade by rubbing on the back thereof, and also heat it and give rise to the formation of flaws, etc. While cylindrical rollers have point contact, they must, in order to run at a moderate speed, be of such large dimensions that a clumsy supporting apparatus is necessary on the machine, and the roller oscillates despite the great size and weight of such apparatus. The cone roller has also a point bearing, and, while taking up the least possible space, may be sufficiently large to be run at low speed, so that its bearing and the lubrication thereof are simplified. It can be fitted as desired in the free space either to the left or the right of the saw blade.

The material used for the cheeks ensures the saw blade being spared. The cheeks are made of soft or non-ferrous metal, rawhide, fibre or the like so that when there is friction between them and the blade they are worn away, without detriment to the blade.

It is of importance in the guiding that in order to prevent the lateral displacement, the guide cheeks can be brought quickly and easily on to the surface of the work. The cheeks either separately or as a unit, can be rocked about a common axis of rotation, or alternatively may be vertically adjustable.

Provision is also made to prevent the saw blade being braked or impeded by falling particles of the work. Cleaning means are located on both sides of the blade on the same mounting as the cheeks, and above them. In addition, the outer points of the curved cheeks are not situated at the same horizontal level.

The running saw blade takes up, for example, resin from the wood, and gums up the wheel coverings; its passage through the work is subject to a greater resistance, so that the energy used is increased. The mechanical cleaning device or scraper and a device for treating the blade to prevent adhesion thereto of free substances, such as chips from the work, are therefore included in the guide unit. The blade thus remains clean and energy is saved.

It will be difficult in many cases to arrange the vertical support by which the several guide means are attached to the machine directly behind the saw blade. The spindle which carries the guide parts must consequently be arranged adjustable towards both sides. This is provided for according to the invention by means of an annulus in the fixing clamp, with an eccentric to take the spindle. By rotating the eccentric, a lateral displacement to the right or left, and thus an exact adjustment, is made possible. The consequent vertical motion is unimportant, but if necessary, can be compensated for by vertical adjustment of the clamp on the support.

The drawings show an example of carrying out of the invention. Fig. 1 is a front view of the guide, Fig. 2 a plan view of the same, Fig. 3 is a side view of same, Fig. 4 is a cross section through a roller supporting member provided with a spring controlled bearing and stops, Fig. 5 shows the supporting rod of the sawing machine provided with an eccentric device for carrying a spindle as hereinafter described, and Fig. 6 shows the arrangement of the side cheeks.

In Figs. 1 and 2, 1 and 2 are the two side cheeks with curved guide surfaces. They are made of a material of a lower degree of hardness than the saw blade, so that they wear away. Fibre, non-ferrous metals, or artificial substances can, for example, be used as this material. The outstanding points of the cheeks lie at different levels, so that the saw blade 3 cannot be jammed or braked by falling particles of the work.

The back guide roller 4 is of cone shape. On its surface are provided circular steps 5 in which the saw blade 3 is supported, thus being constrained from lateral oscillation. The deflection of the saw blade towards the free side of the step may be prevented by a second back guide roller 4', arranged on the other side of the saw blade. The back guide rollers are forwardly displaceable; by means of the spring 6 in the bearing 9, they are pressed against the back of the saw blade. The extent of displacement is limited by stops 12 (Fig. 4) arranged in the bearing. This spring bearing is advantageous when a thick saw blade or a number of rollers is employed since in the case of inexact adjustment, owing to the spring action, all the rollers bear on the back of the blade.

Below the cheeks is arranged an apparatus 7 which applies a liquid, such as oil or the like, to the saw blade, in order to prevent the attachment of adhesive or lubricating substances to the blade. In this way, power is saved, and furthermore, soiling of the cheeks by detached incrustations is prevented. Above the cheeks there is provided a mechanical device 8, in the form of a dust remover which takes off particles of dust which would make the coverings of the rollers smooth, and also particles carried round from the work which otherwise might fall on the guide.

Both the side guides 1, 2 as also the back guide roller 4, are carried by a spindle 10'. The bearing 9 for the shaft of the back guide roller is carried by a sleeve 11 rotatably fitted on the spindle 10'. In this way, the longitudinal displacement and rotation of the back guide roller is attained. The spindle 10 carrying the side cheeks is fixed on a vertical rod 18, which is displaceable in the vertical direction in a collar or bearing 19 fixed on the spindle part 10'. Thus, without displacing the clamp 15 on the support 16, a rapid displacement of the side cheeks along the band is possible. For the purpose of adjusting the side cheeks 1, 2 on the band, the spindle 10' is inserted in a rotatable eccentric 13. This inset piece is fitted in a corresponding annulus 14 (Fig. 5) in the clamp 15 which serves for fixing the guide means to the support 16. By means of the set screw 17, the eccentric 13 can be fixed after the correct adjustment of the guide.

The second back guide roller, may be supported similarly to the roller 4.

If desired, additional back supporting rollers or side cheeks may be provided on the rod 16 as is indicated in dotted lines in Fig. 1.

I claim:

1. In a guide for the blade of a band saw, the combination of: a conical roller for supporting the back edge of the blade, and steps provided on the conical surface of said roller and running round the said surface.

2. In a guide for the blade of a band saw, the combination of: a conical roller for supporting the back edge of the blade; and rigid covered side cheeks the curved surfaces of which have generatrices running parallel to the breadth of the saw blade, along which generatrices the blade is guided and secured against lateral movement.

3. In a guide for the blade of a band saw, the combination of: a conical roller for supporting the back edge of the blade; and rigid curved side cheeks made of non-ferrous metal, the curved surfaces of which have generatrices running parallel to the breadth of the saw blade, along which generatrices the blade is guided and secured against lateral movement.

4. In a guide for the blade of a band saw: a vertical support; a clamp thereon; a horizontal spindle carried by said clamp; a stepped conical roller for supporting the back edge of the blade swingable and adjustable on said spindle; and curved side cheeks for preventing lateral movement of the blade, carried by said spindle.

5. In a guide for the blade of a band saw: a vertical support; a clamp thereon; a horizontal spindle carried by said clamp; a stepped conical roller for supporting the back edge of the blade swingable and adjustable on said spindle; a collar on said spindle; a rod vertically adjustable in said collar; and curved side cheeks carried by said rod for preventing lateral movement of the blade.

6. In a guide for the blade of a band saw: a vertical support; a clamp thereon; a horizontal spindle carried by said clamp; a stepped conical roller for supporting the back edge of the blade swingable and adjustable on said spindle; a rod vertically adjustable on said spindle; and curved side cheeks carried by said rod for preventing lateral movement of the blade, said cheeks being so located that their curves project towards the blade at different levels.

7. In a guide for the blade of a band saw: a vertical support; a clamp thereon; a horizontal spindle carried by said clamp; a stepped conical roller for supporting the back edge of the blade swingable and fixable on said spindle; a bearing on said spindle;

a rod vertically adjustable in said bearing; and curved side cheeks carried by said rod for preventing lateral movement of the blade, said side cheeks being so located that their curves project towards the blade at different levels.

8. In a guide for the blade of a band saw: a vertical support; a clamp thereon having an annulus; a horizontal spindle; an eccentric on the spindle journalled in said annulus, said spindle being laterally adjustable by means of said eccentric; a stepped conical roller for supporting the back edge of the blade swingable on said spindle; and curved side cheeks for preventing lateral movement of the blade carried by said spindle.

9. In a guide for the blade of a band saw; a vertical support; a clamp thereon having an annulus; a horizontal spindle; an eccentric on the spindle journalled in said annulus, said spindle being laterally adjustable by means of said eccentric; a stepped conical roller for supporting the back edge of the blade adjustable on said spindle; a bearing on said spindle; a rod vertically adjustable in said bearing; and curved side cheeks carried by said rod for preventing lateral movement of the blade, said cheeks being so located that their curves project towards the blade at different levels.

10. In a guide for the blade of a band saw: a vertical support; a clamp thereon; a horizontal spindle carried by said clamp; a stepped conical roller for supporting the back edge of the blade laterally adjustable on said spindle; a rod vertically adjustable on said spindle; curved side cheeks carried by said rod for preventing lateral movement of the blade; a supply source for liquid for treating the blade; and means for applying said liquid to the blade.

11. In a guide for the blade of a band saw: a vertical support; a clamp thereon; a horizontal spindle carried by said clamp; a sleeve on the spindle; a bearing in the sleeve oblique to the spindle; a shaft rotatable and axially movable in said bearing; a spring pressing the shaft axially; stops limiting the axial movement of the shaft; a stepped conical roller on said shaft for supporting the back edge of the blade; a sleeve on said spindle; a rod vertically adjustable in said sleeve; and curved side cheeks carried by said rod for preventing lateral movement of the blade.

12. In a guide for the blade of a band saw: a vertical support; a clamp thereon having an annulus; a horizontal spindle; an eccentric on the spindle journalled in said annulus, said spindle being laterally adjustable by means of said eccentric; a sleeve on the spindle; a bearing in the sleeve oblique to the spindle; a shaft rotatable and axially movable in said bearing; a spring pressing the shaft axially; stops limiting the axial movement of the shaft; a stepped conical roller on said shaft for supporting the back edge of the blade; a collar on said spindle; a rod vertically adjustable in said collar; curved side cheeks carried by the rod for preventing lateral movement of the blade, said cheeks being so located that their curves project towards the blade at different levels; a supply source for oil for the blade; and means for applying said oil to the blade below the cheeks.

In testimony whereof I affix my signature.

ANTON STEFAN PRAGERSTORFER.